United States Patent
Li et al.

(10) Patent No.: US 8,556,219 B2
(45) Date of Patent: Oct. 15, 2013

(54) MOUNTING APPARATUS FOR DATA STORAGE DEVICE

(75) Inventors: Nai-Juan Li, Wuhan (CN); Zhi-Ping Wu, Wuhan (CN); Xu-Dong Nan, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/414,858

(22) Filed: Mar. 8, 2012

(65) Prior Publication Data

US 2013/0015305 A1    Jan. 17, 2013

(30) Foreign Application Priority Data

Jul. 14, 2011    (CN) .......................... 2011 1 0197043

(51) Int. Cl.
| | |
|---|---|
| A47B 96/06 | (2006.01) |
| A47G 29/00 | (2006.01) |
| A47K 1/00 | (2006.01) |
| E04G 3/00 | (2006.01) |
| E04G 5/06 | (2006.01) |
| F21V 21/00 | (2006.01) |
| F21V 35/00 | (2006.01) |

(52) U.S. Cl.
USPC ................. 248/220.21; 312/223.2; 312/223.1

(58) Field of Classification Search
USPC ........ 248/27.1, 27.3, 220.21, 221.11, 222.11, 248/225.11, 611, 612; 361/679.33, 679.37, 361/679.57, 679.38, 679.39; 312/223.2, 312/223.1, 333
See application file for complete search history.

(56) References Cited

U.S. PATENT DOCUMENTS

| | | | | |
|---|---|---|---|---|
| 6,299,266 | B1 * | 10/2001 | Justice et al. ............... | 312/223.2 |
| 6,760,226 | B2 * | 7/2004 | Chen ............................. | 361/725 |
| 7,180,734 | B2 * | 2/2007 | Jing ......................... | 361/679.33 |
| 7,187,541 | B2 * | 3/2007 | Franke et al. ............ | 361/679.33 |
| 7,259,960 | B2 * | 8/2007 | Hua et al. .................. | 361/679.33 |
| 7,299,933 | B2 * | 11/2007 | Chen et al. ...................... | 211/26 |
| 7,679,896 | B2 * | 3/2010 | Deng et al. ............... | 361/679.33 |
| 7,950,752 | B2 * | 5/2011 | Lin ................................ | 312/333 |
| 8,132,869 | B2 * | 3/2012 | Wang et al. ................. | 312/223.2 |
| 8,240,627 | B2 * | 8/2012 | Chen et al. ................. | 248/309.1 |
| 8,295,044 | B2 * | 10/2012 | Chen et al. .................. | 248/224.8 |
| 2002/0080573 | A1 * | 6/2002 | Sheng-Hsiung et al. ..... | 361/685 |
| 2004/0114320 | A1 * | 6/2004 | Williams et al. ............. | 361/685 |
| 2006/0198096 | A1 * | 9/2006 | Hua et al. ...................... | 361/685 |
| 2007/0164170 | A1 * | 7/2007 | Huang et al. ................. | 248/27.1 |

* cited by examiner

Primary Examiner — Nkeisha Smith
(74) Attorney, Agent, or Firm — Altis & Wispro Law Group, Inc.

(57) ABSTRACT

A mounting apparatus for a data storage device comprises a bracket and a locking member attached to the bracket. A plurality of fixing holes is defined in one side of the data storage device. The bracket comprises a bottom wall, a first sidewall and a second sidewall. The bottom wall, the first sidewall and the second sidewall together define a receiving space. A through hole is defined on the first sidewall. The locking member comprises a securing portion and at least one resilient piece extending from the securing portion. A latching portion is located on the resilient piece. The latching portion extends through the through hole to engage in the fixing hole, and configured to disengaged from the fixing hole by the resilient piece elastically deformed.

15 Claims, 4 Drawing Sheets

MOUNTING APPARATUS FOR DATA STORAGE DEVICE

BACKGROUND

1. Technical Field

The present disclosure relates to mounting apparatuses, and particularly to a mounting apparatus for mounting a data storage device.

2. Description of Related Art

A typical personal computer comprises data storage devices, such as hard disk drives (HDDS), floppy disk drives, and compact disc-read only memories (CD-ROMS) drives. Conventionally, the data storage devices are attached to a computer enclosure chassis with screws. A tool such as a screwdriver is used to fasten or unfasten the screws when mounting or removing the data storage devices. Mounting or dismounting the data storage devices may be laborious and time-consuming.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
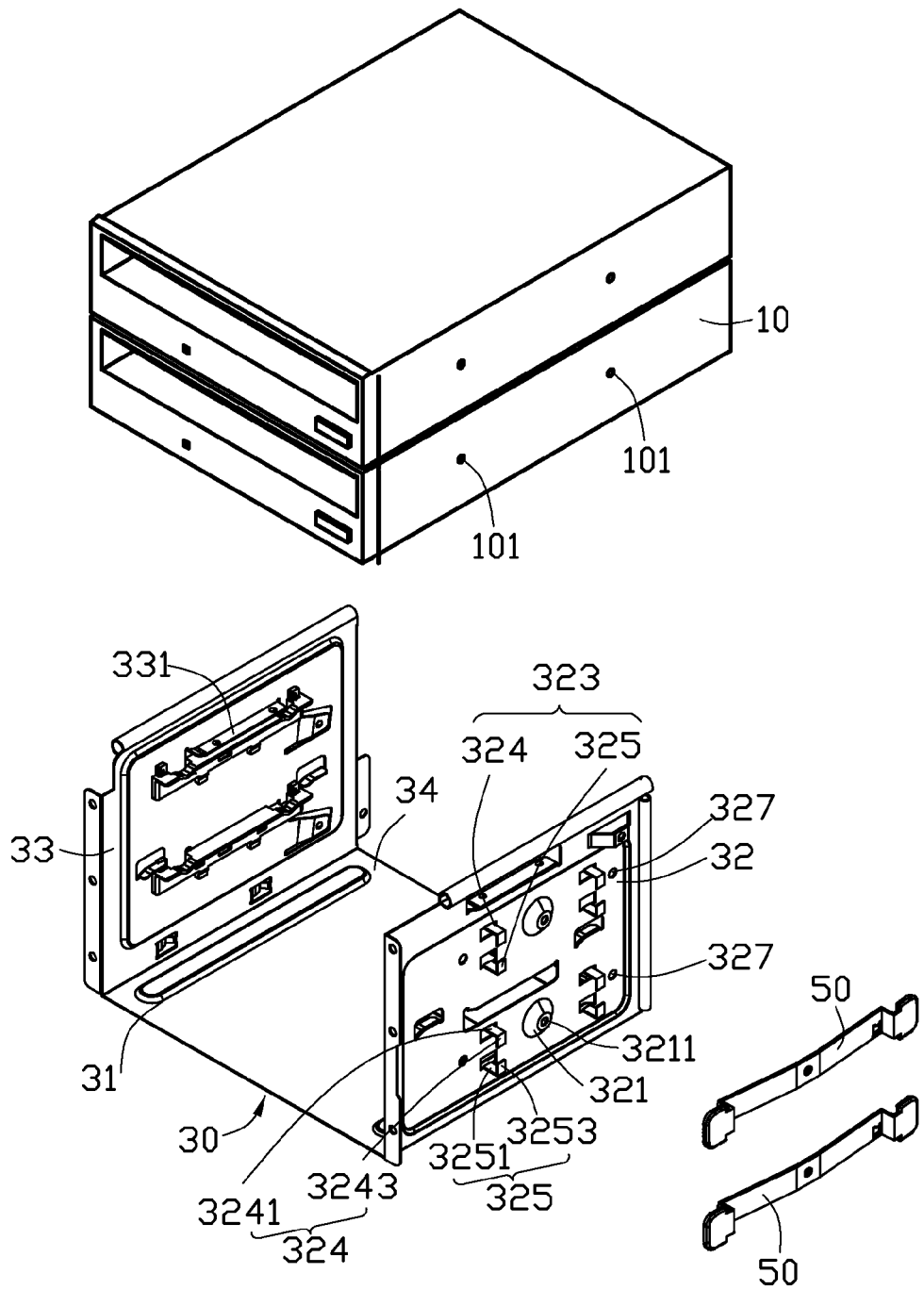
FIG. 1 is an exploded, isometric view of an embodiment of a mounting apparatus and two data storage devices.
Figure 2:
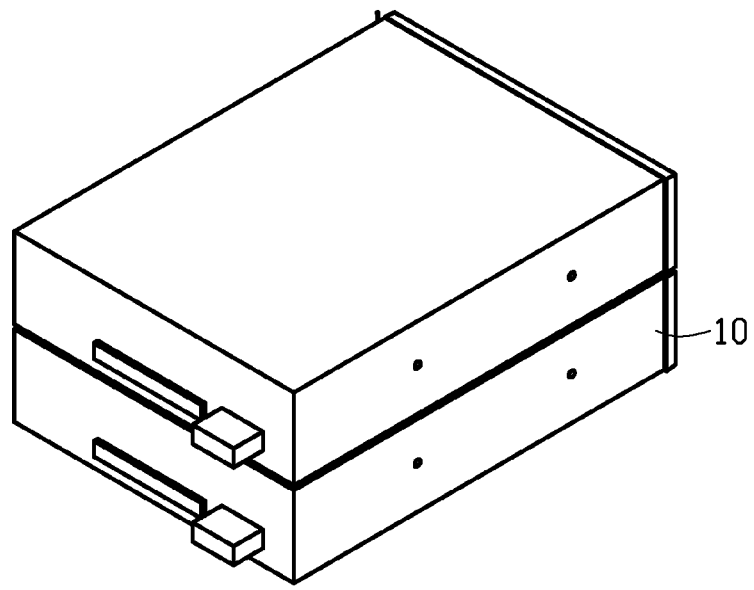
FIG. 2 is similar to FIG. 1, but viewed in a different aspect.
Figure 2:
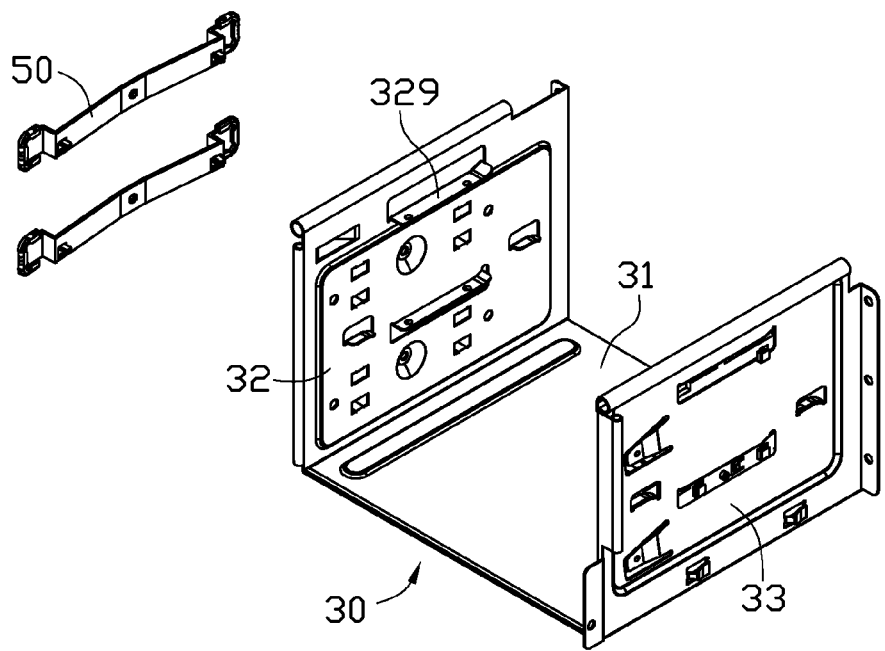

Referring to FIGS. 1-2, a mounting apparatus in accordance with an embodiment comprises a bracket 30 and two locking members 50 attached to the bracket 30. In one embodiment, two data storage devices 10 are received in the bracket 30, and each of the two data storage devices 10 defines two fixing holes 101. The two data storage devices 10 may be hard disk drives (HDDS), floppy disk drives, and compact disc-read only memories (CD-ROMS) drives.

The bracket 30 comprises a bottom wall 31, a first sidewall 32 and a second sidewall 33. The bottom wall 31, the first sidewall 32 and the second sidewall 33 together define a receiving space 34 configured to accommodate the two data storage devices 10. The first sidewall 32 and the second sidewall 33 extend from two opposite sides of the bottom wall 31. In one embodiment, the first sidewall 32 is substantially parallel with the second sidewall 33, and the first sidewall 32 and the second sidewall 33 are substantially perpendicular to the bottom wall 31.

Two protrusions 321 are located on the outer surface of the first sidewall 32. Each of the two protrusions 321 defines a limiting hole 3211. Four pairs of hooks 323 are located on the first sidewall 32. In one embodiment, the four pairs of hooks 323 are arranged at four corners of a rectangle area. Each of the two protrusions 321 is located between two pairs of hooks 323. Each of the four pairs of hooks 323 comprises a first hook 324 and a second hook 325 opposite to the first hook 324. The first hook 324 comprises a first stopper portion 3241 and a first engaging portion 3243 substantially perpendicular to the first stopper portion 3241. The second hook 325 comprises a second stopper portion 3251 and a second engaging portion 3253 substantially perpendicular to the second stopper portion 3251. In one embodiment, the first stopper portion 3241 is substantially parallel with the second stopper portion 3251. A through hole 327 adjacent to a pair of hooks 323 is defined on the first sidewall 32. Two first blocking portions 329 are aligned in the vertical direction and extend inwardly from the first sidewall 32.

Two second blocking portions 331 extend inward from the second sidewall 33.

Figure 3:
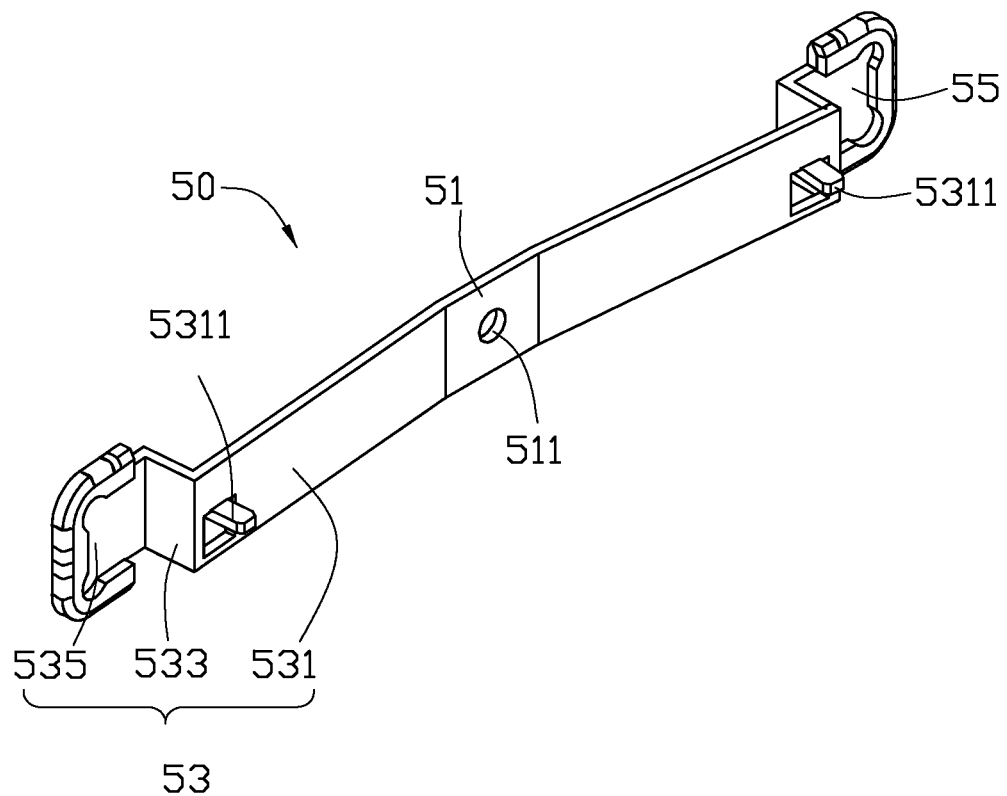
FIG. 3 is an isometric view of a locking member of FIG. 1.

Referring to FIG. 3, each of the two locking members 50 comprises a securing portion 51 and two resilient pieces 53. A securing hole 511 is defined in the securing portion 51. Each of the two resilient pieces 53 comprises a resilient portion 531, a connecting portion 533 and an operating portion 535. The resilient portion 531 extends from each of two opposite ends of the securing portion 51. In one embodiment, an obtuse angle is defined between the resilient portion 531 and the securing portion 51. A latching portion 5311 adjacent to the connecting portion 533 is located on the resilient portion 531. In one embodiment, the latching portion 5311 is substantially perpendicular to the resilient portion 531. The connecting portion 533 extends from of the resilient portion 531. In one embodiment, the connecting portion 533 is substantially perpendicular to the resilient portion 531. The operating portion 535 extends from the connecting portion 533, for driving each of the two resilient pieces 53. In one embodiment, the operating portion 535 is substantially perpendicular to the connecting portion 533.

Figure 4:
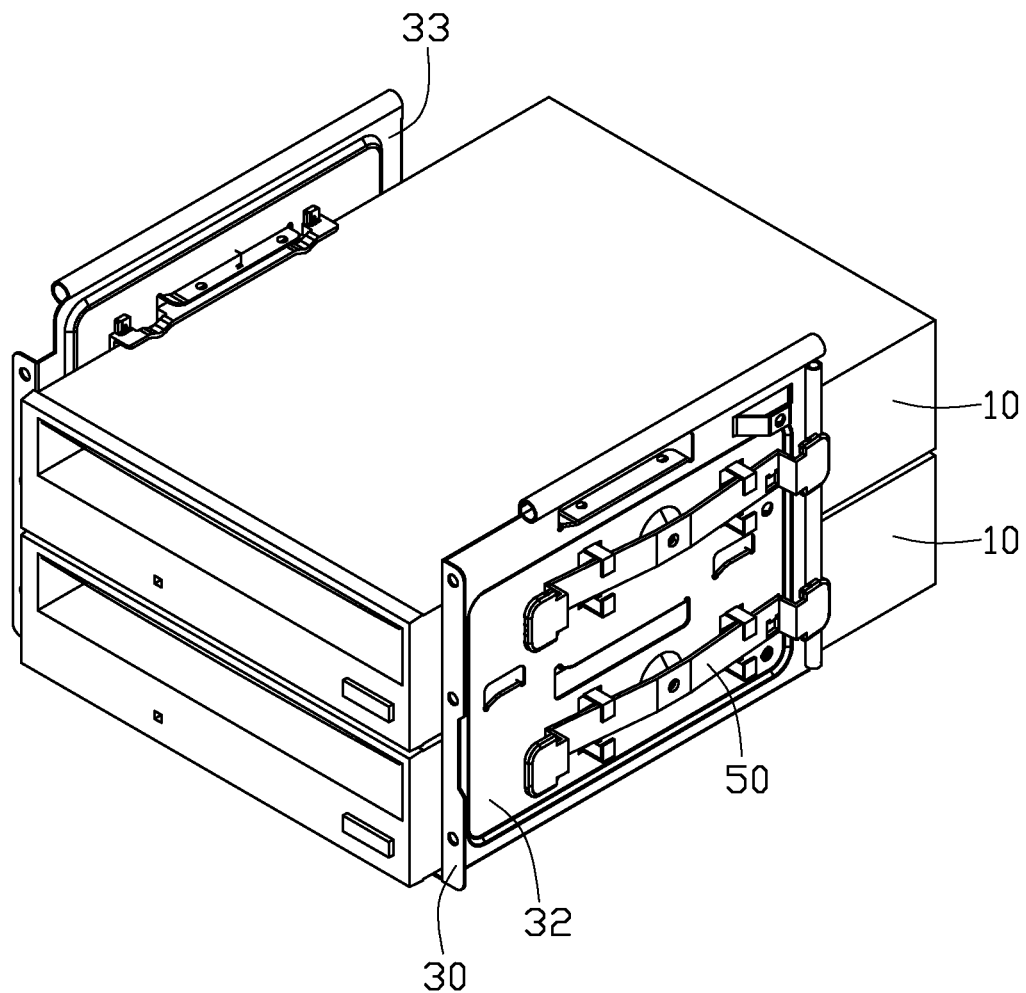
FIG. 4 is an assembled view of the mounting apparatus and the two data storage devices of FIG. 1.

Referring to FIG. 4, in assembly of the two locking members 50 to the bracket 30, each of the two resilient pieces 53 is engaged between each pair of hooks 323. The securing hole 511 is aligned with the limiting hole 3211. A mounting member extends through the securing hole 511 and the limiting hole 3211 to secure each of the two locking members 50 to the first sidewall 32. The latching portion 5311 of each of the two resilient pieces 53 is engaged in the corresponding through hole 327. The resilient portion 531 is engaged between each pair of hooks 323.

In mounting of the two data storage devices 10 to the bracket 30, the latching portion 5311 of each of the two resilient pieces 53 is disengaged from the through hole 327 when the two resilient pieces 53 are pulled away from the first sidewall 32 to elastically deform the resilient portion 531. The two data storage devices 10 are slid in the bracket 30 along the two first blocking portions 329 and the two second blocking portions 331, until the two fixing holes 101 of the two data storage devices 10 are aligned with the corresponding through holes 327. The resilient portion 531 elastically returns to drive the latching portion 5311 to extend through the through hole 327 and to be engaged in each of the two fixing holes 101. Thereby the two data storage devices 10 are secured to the bracket 30.

In disassembling of the two data storage devices 10 from the bracket 30, the operating portion 535 of each of the two resilient pieces 53 is pulled away from the first sidewall 32 to drive the latching portion 5311 to be disengaged from each of the two fixing holes 101. The two data storage devices 10 can be pulled out from the receiving space 34.

What is claimed is:

1. A mounting apparatus for a data storage device comprising:
   a bracket comprising a bottom wall, a first sidewall and a second sidewall, the first sidewall and the second sidewall located on two sides of the bottom wall, a receiving space defined between the bottom wall, the first sidewall and the second sidewall for receiving the data storage device, the first sidewall defining a through hole;
   a locking member, comprising a securing portion, and a resilient piece located on the securing portion, the securing portion directly secured to the first sidewall, the resilient piece comprising a latching portion;
   wherein the latching portion extends through the through hole to engage in a fixing hole defined in the data storage device, for preventing the data storage device from disengaging from the receiving space, and the resilient piece is elastically deformable to disengage the latching portion from the fixing hole;
   the resilient piece comprises a resilient portion extending from the securing portion towards the first sidewall; and
   the resilient piece further comprises a connecting portion extending from the resilient portion, and the connecting portion is substantially perpendicular to the resilient portion.

2. The mounting apparatus of claim 1, wherein a protrusion is located on the first sidewall, and the securing portion is secured to the protrusion.

3. The mounting apparatus of claim 2, wherein a pair of hooks are located on the first sidewall between the protrusion and the through hole.

4. The mounting apparatus of claim 3, wherein the pair of hooks comprises a first hook and a second hook opposite to the first hook, and the resilient portion is engaged between the first hook and the second hook.

5. The mounting apparatus of claim 4, wherein the first hook comprises a first stopper portion extending from the first sidewall, the second hook comprises a second stopper portion extending from the first sidewall, and the first stopper portion is substantially parallel with the second stopper portion.

6. The mounting apparatus of claim 5, wherein the first hook further comprises a first engaging portion extending from the first stopper portion, the second hook further comprises a second engaging portion extending from the second stopper portion, and the first engaging portion and the second engaging portion are engaged in two opposite sides of the resilient portion, for preventing the resilient portion from being over-deformed.

7. The mounting apparatus of claim 1, wherein an obtuse angle is defined between the securing portion and the resilient portion.

8. The mounting apparatus of claim 1, wherein the resilient piece comprises an operating portion substantially perpendicular to the connecting portion, for driving the resilient piece to elastically deform.

9. A mounting apparatus for a data storage device comprising:
   a bracket comprising a bottom wall, a first sidewall and a second sidewall located on two side of the bottom wall, a receiving space defined between the bottom wall, the first sidewall and the second sidewall for receiving the data storage device, the first sidewall defining two through holes;
   a locking member comprising a securing portion directly secured to an outside of the first sidewall, two resilient pieces being located on the securing portion, each of the two resilient pieces comprises a latching portion;
   wherein each of the two resilient pieces is elastically deformable to move from a first position to a second position; when each of the two resilient pieces is in the first position, the latching portion of each of the two resilient pieces is disengaged from a fixing hole defined in the data storage; when each of the two resilient pieces is in the second position, the latching portion of each of the two resilient pieces extends through each of the two through holes to engage in the fixing hole, for preventing the data storage device from disengaging from the receiving space;
   the two resilient pieces extend from two opposite sides of the securing portion, and the two resilient pieces are mirror symmetric;
   each of the two resilient pieces further comprises a resilient portion, and the resilient portion of each of the two resilient pieces extends from the securing portion towards the first sidewall; and
   the latching portion of each of the two resilient pieces is located on the resilient portion of each of the two resilient pieces and is substantially perpendicular to the resilient portion.

10. The mounting apparatus of claim 9, wherein a protrusion is located on the first sidewall, and the securing portion is secured to the protrusion.

11. The mounting apparatus of claim 9, wherein each of the two resilient pieces further comprises a connecting portion extending from the resilient portion, and the connecting portion is substantially perpendicular to the resilient portion.

12. The mounting apparatus of claim 11, wherein each of the two resilient pieces further comprises an operating portion perpendicular to the connecting portion, for driving the resilient portion of each of the two resilient pieces to be elastically deformed.

13. The mounting apparatus of claim 9, wherein the first sidewall comprises two pairs of hooks, and each of the two resilient pieces is engaged between each of the two pairs of hooks.

14. The mounting apparatus of claim 13, wherein each of the two pairs of hooks comprises a first hook and a second hook opposite to the first hook, and the first hook and the second hook are engaged in two sides of the resilient portion for preventing the resilient portion from being over-deformed.

15. The mounting apparatus of claim 10, wherein an obtuse angle is defined between the securing portion and the resilient portion.

* * * * *